(12) United States Patent
Grant et al.

(10) Patent No.: US 6,318,632 B1
(45) Date of Patent: Nov. 20, 2001

(54) SMART CARD READER WITH ELECTROSTATIC DISCHARGE PROTECTION

(75) Inventors: John Lincoln Grant, Sherborn, MA (US); Claude Grant Folta, Georgetown, TX (US)

(73) Assignee: Airborn, Inc., Georgetown, TX (US)

( * ) Notice: Subject to any disclaimer, the term of this patent is extended or adjusted under 35 U.S.C. 154(b) by 0 days.

(21) Appl. No.: 09/126,123

(22) Filed: Jul. 30, 1998

(51) Int. Cl.[7] ...................................................... G06K 7/06
(52) U.S. Cl. .............................. 235/441; 235/439; 15/1.5; 15/210.1
(58) Field of Search .................................... 235/439, 441, 235/449, 482, 483, 486, 492; 361/212, 213, 220; 15/1.51, 1.52, 210.1; 29/600, 852

(56) References Cited

U.S. PATENT DOCUMENTS

| | | | |
|---|---|---|---|
| 3,904,929 | * 9/1975 | Kanaya et al. | 361/220 |
| 4,477,263 | 10/1984 | Shaver et al. | 55/6 |
| 4,641,948 | * 2/1987 | Nakahata et al. | 361/213 X |
| 4,757,421 | 7/1988 | Mykkanen | 361/231 |
| 4,900,272 | 2/1990 | Lange et al. | 439/630 |
| 4,900,273 | 2/1990 | Pernet | 439/630 |
| 4,969,842 | 11/1990 | Davis | 439/629 |
| 5,043,562 | 8/1991 | Hautvast et al. | 235/440 |
| 5,157,244 | 10/1992 | Mroczkowski et al. | 235/441 |
| 5,161,992 | 11/1992 | Birch | 439/260 |
| 5,231,274 | 7/1993 | Reynier et al. | 235/441 |
| 5,380,997 | 1/1995 | Hania et al. | 235/485 |
| 5,389,001 | * 2/1995 | Broschard, III et al. | 439/159 |
| 5,493,771 | * 2/1996 | Sinha et al. | 29/600 |
| 5,569,898 | * 10/1996 | Fisher et al. | 235/449 X |
| 5,600,122 | * 2/1997 | Isono et al. | 235/483 |
| 5,671,123 | * 9/1997 | Omori et al. | 361/212 X |
| 5,691,525 | 11/1997 | Aoki et al. | 235/379 |
| 5,710,692 | * 1/1998 | Muck et al. | 361/212 |
| 5,892,216 | * 4/1999 | Grant et al. | 235/492 |
| 5,915,757 | * 6/1999 | Tsuyama et al. | 29/852 |
| 6,084,759 | * 7/2000 | Hansson et al. | 361/111 |

FOREIGN PATENT DOCUMENTS 002678798    1/1993  (FR) .

OTHER PUBLICATIONS

Beckaert Corp. product literature for Beki–Shield conductive plastics, Nov. 1996, 2 pages.

"Statistically Dissipative Thermoplastic Polyester, Stat–Kon W Series" Technical Data, LNP Engineering Plastics, Inc., Jan. 25, 1996, 2 pages.

"Stat–Kon. A guide to LNP's Line of Thermoplastic Composites for Electrostatic Dissipation," LNP Engineering Plastics, Bulletin 223–894, 1994, 12 pages. No month available.

"The Passivator", Chapman Corporation, 1993, 2 pages. No month available.

"Stainless Fibers Add Shielding to Housing", Bekaert Fibre Technologies, Jan. 1991, 1 page.

* cited by examiner

Primary Examiner—Michael G. Lee
Assistant Examiner—Jared J. Fureman
(74) Attorney, Agent, or Firm—Jenkens & Gilchrist, A Professional Corporation

(57) ABSTRACT

Apparatus and methods for removing electrostatic charge from a generally non-conductive object that is inserted into a port or receptacle of a housing are disclosed, such as a smart card having an electrostatic charge thereon inserted into a slot of a housing of a smart card reader. Certain ones of the apparatus and methods use a housing including a slot for receiving a generally non-conductive object having an electrostatic charge thereon, and an electrically ungrounded array of protrusions disposed proximate the slot. Selected ones of the protrusions have a sharp tip. The electrostatic charge on the object and the sharp tips generate an electric field that is used to neutralize the electrostatic charge on the object so as to prevent damaging electric shock.

8 Claims, 6 Drawing Sheets

SMART CARD READER WITH ELECTROSTATIC DISCHARGE PROTECTION

FIELD OF THE INVENTION

The present invention generally pertains to removing electrostatic charge from a non-conductive object that is inserted into a port or receptacle. The present invention also generally pertains to smart card readers, and more particularly, but not by way of limitation, to a card reader for eliminating problems with electrostatic discharge that often occur when a non-conductive smart card is inserted into a card reader.

HISTORY OF THE RELATED ART

Credit cards have long been an accepted part of life around the world. Early credit cards had identifying information raised from the remainder of the card, and the identifying information was transferred from the card by the use of pressure and carbon paper. More modern credit and debit cards have their identifying information as fixed electronic data, such as a scanable magnetic strip embedded on the surface of a card. Such identifying information exists within the card in a read-only format. Smart cards, the most recent advancement in the card art, utilize an active integrated circuit embedded within the card to store identifying information. Unlike prior art cards, smart cards have the additional capability of altering the identifying information stored in their integrated circuits. Smart cards may be utilized for any function of a prior art credit or debit card and have also proven useful in a wide variety of other functions, including paying bills; paying for mass transit; performing health care benefit transactions; and in using pay telephones, automated teller machines, in-home digital satellite systems, "set top" boxes used with cable television, or other similar equipment.

The integrated circuit in a smart card is typically a memory chip or a microprocessor chip. To provide access to the information stored in the integrated circuit of the card, operative regions such as contact pads are provided on the surface of the card, and the integrated circuit is electrically connected to these operative regions.

A smart card reader typically has a housing having a slot through which the card is inserted and removed. After insertion, the smart card is manipulated into a reading position, in which the operative regions of the card are in contact with certain terminals in the card reader. The terminals of the card reader are typically electrically connected to a printed circuit board containing the additional circuitry necessary for a given transaction. After a transaction is complete, the card is returned to the user.

Electrostatic discharge (ESD) frequently creates problems for smart card users. Smart cards are typically made of a generally non-conductive material, such as plastic. However, such generally non-conductive smart cards often have some minimal level of electrical conductivity. Smart cards may also be made of a partially conductive material, such as plastic with a carbon or other conventional conductive filler disposed therein. Normal handling of a card, such as removal and insertion of a card from a user's wallet or billfold, may cause electrostatic charge to build up in the card. When a user inserts a card into a smart card reader, and when the card comes into contact with the conductive terminals of the card reader, electric shock may occur. This electric shock is similar to the shock that occurs when one walks across a carpeted floor and then touches a metal object such as a lamp. Such shock may damage or cause malfunction of the integrated circuit within the smart card, and it may also damage or cause malfunction of the circuitry on the printed circuit board to which the card reader is electrically connected.

In addition, after a period of use, body oils or other partially conductive material may collect on the surface of a smart card. Such conductive material may be sufficient to transfer electrostatic charge built up on the user of a card to the card itself. Such additional electrostatic charge exacerbates the ESD problems experienced by smart cards.

Several prior art techniques have been formulated to address the ESD problem of smart cards. For example, it is known to provide a smart card reader with a cover or top portion made of a conductive material and to connect the cover to ground. During insertion, a smart card contacts the cover before it contacts the conductive terminals connected to the base or bottom portion of the smart card reader. In this way, electrostatic charge may be discharged through the cover to ground, and a damaging electric shock is avoided. U.S. Pat. No. 5,380,997 assigned to Alcatel Radiotelephone discloses such a technique.

In addition, it is known to form a card reader cover from a highly resistive, yet conductive material and to ground the cover to a chassis. Alternatively, it is also known to paint or coat the cover of a card reader with a highly resistive, yet conductive material and to ground the painted cover to a chassis. Such materials provide a relatively slow discharge rate for the electrostatic charge, in contrast to the relatively fast discharge rate of a damaging electric shock. Furthermore, a variety of conventional conductive plastics providing ESD protection and electromagnetic interference shielding are sold by the Bekaert Corporation of Marietta, Ga. under the BEKI-SHIELD trademark.

U.S. application Ser. No. 08/843,735 filed Apr. 21, 1997, which is commonly owned with the subject application and is incorporated herein by reference, discloses several advantageous techniques to ground a smart card reader and to insure proper electrical isolation of the electrical components therein. The grounding techniques disclosed in U.S. application Ser. No. 08/843,735 involve the use of highly resistive, yet conductive materials for the cover or base of a smart card reader.

Each of the above-referenced techniques may be generally described as a "conductive discharge technique". Conductive discharge techniques require a conductive member to physically touch a charged object and provide a path to ground through which current may flow in order to remove the electrostatic charge from the object. For current to flow, both the charged object and the path to ground must be at least partially conductive. Objects that are extremely non-conductive, such as, by way of example, objects that have a surface resistivity substantially above $1\times10^{10}$ ohms/sq (ohms/square), and most typically in the range of about $1\times10^{14}$ ohms/sq to about $1\times10^{15}$ ohms/sq, cannot be discharged in this manner because they will not allow sufficient current to flow through the objects themselves, even though the path to ground may be extremely conductive.

In many cases, the plastic materials used to manufacture conventional smart cards are extremely non-conductive. Electrostatic charge may build up in such cards, as described hereinabove, and such charge may induce an opposite charge on nearby conductive parts, such as a conductive member in a card reader into which the card is inserted. Such inducement does not discharge the card itself because current does not flow from the card, and the induced charge on the conductive member in the smart card reader may remain after the card is removed from the reader. The induced charge may "arc"to other conductive members within the smart card reader, causing electric shock damage to the card reader or the circuitry of the printed circuit board to which the card reader is electrically connected. In addition, when another smart card is subsequently inserted into the card reader and comes close to, or in contact with, the conductive member in which the induced charge exists, electric shock may also damage or cause malfunction of the integrated circuit within the smart card. Therefore, a need exists in the card reader industry for a simple, low cost technique of safely and efficiently removing electrostatic charge from smart cards made from a non-conductive material, and especially an extremely non-conductive material.

SUMMARY OF THE INVENTION

One aspect of the present invention comprises a smart card reader including a housing having a slot for receiving a smart card, and an electrically ungrounded array of protrusions disposed on the housing. Selected ones of the protrusions have a sharp tip disposed proximate the slot. Upon insertion of a smart card having an electrostatic charge thereon into the slot, an electric field is generated proximate the sharp tips and a surface of the smart card. The electric field creates a plurality of positive and negative ions, and the positive and negative ions neutralize the electrostatic charge on the smart card.

In another aspect, the present invention comprises a method of removing electrostatic charge from a smart card inserted into a slot of a smart card reader. The method includes the steps of providing an array of protrusions, selected ones of the protrusions having a sharp tip; disposing the array of protrusions proximate a slot of a smart card reader so that the array of protrusions is not electrically connected to a ground; inserting a smart card having an electrostatic charge thereon into the slot; generating an electric field proximate the sharp tips and a surface of the card using the electrostatic charge of the card and the sharp tips; and utilizing the electric field to neutralize the electrostatic charge on the card.

Another aspect of the present invention comprises a method of removing electrostatic charge from a generally non-conductive object. The method includes the steps of providing a housing with a slot for receiving a generally non-conductive object having an electrostatic charge thereon; providing an array of protrusions, selected ones of the protrusions having a sharp tip; disposing the array of protrusions proximate the slot so that the array of protrusions is not electrically connected to a ground; inserting the object into the slot; generating an electric field proximate the sharp tips and a surface of the object using the electrostatic charge of the object and the sharp tips; utilizing the electric field to neutralize the electrostatic charge on the object.

In a further aspect, the present invention comprises a housing including a slot for receiving a generally non-conductive object having an electrostatic charge thereon, and an electrically ungrounded array of protrusions. Selected ones of the protrusions have a sharp tip disposed proximate the slot. Upon insertion of the object having an electrostatic charge thereon into the slot, an electric field is generated proximate the sharp tips and a surface of the object. The electric field creates a plurality of positive and negative ions, and the positive and negative ions neutralize the electrostatic charge on the object.

BRIEF DESCRIPTION OF THE DRAWINGS

For a more complete understanding of the present invention, and for further objects and advantages thereof, reference is made to the following description taken in conjunction with the accompanying drawings, in which:

FIG. 2A is a side view of an alternate embodiment of the array of protrusions of FIG. 2;

DETAILED DESCRIPTION OF THE PREFERRED EMBODIMENT

The preferred embodiment of the present invention and its advantages are best understood by referring to FIGS. 1–5 of the drawings, like numerals being used for like and corresponding parts of the various drawings.

Figure 5:
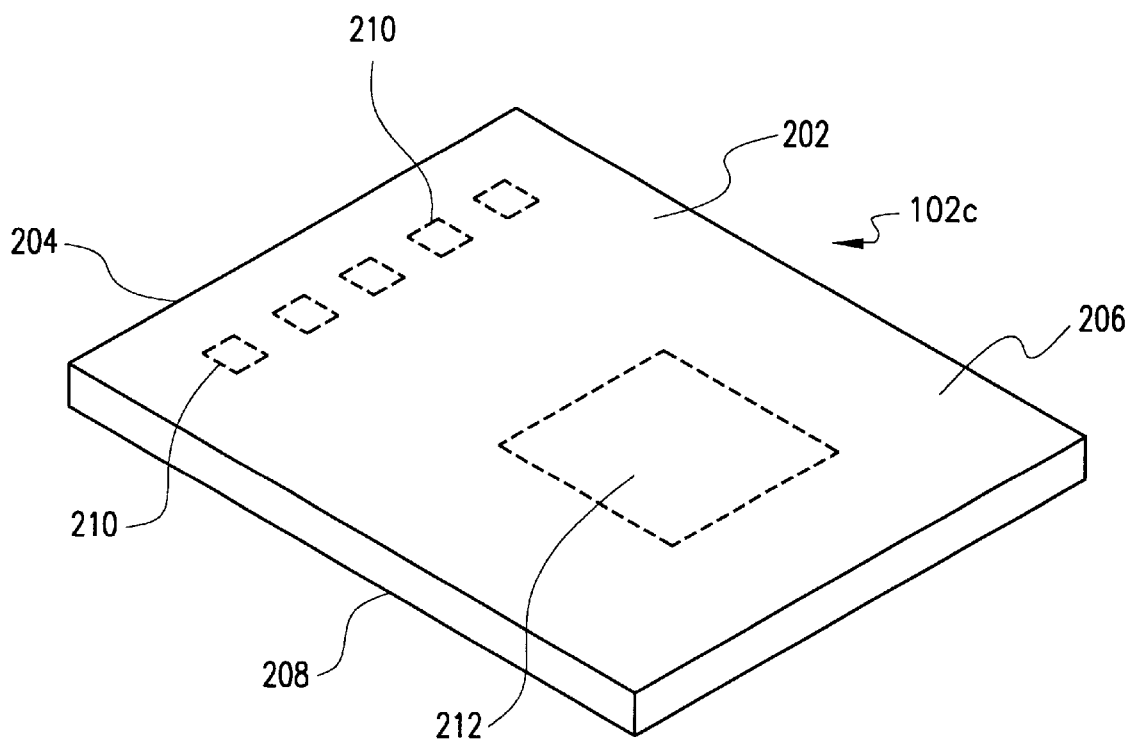
FIG. 5 is a schematic, perspective view of a conventional smart card for use with the card reader housing of FIG. 1.

FIG. 5 shows a schematic, perspective view of a conventional smart card 200. Smart card 200 includes a body 202, a leading edge 204, an upper surface 206, a bottom surface 208, a plurality of operative regions 210 disposed on bottom surface 208, and an integrated circuit 212 disposed within body 202 and electrically connected to operative regions 210. Body 202 is preferably formed with an extremely non-conductive material. Alternatively, body 202 may be formed with a generally non-conductive material, or a partially conductive material.

Figure 1:
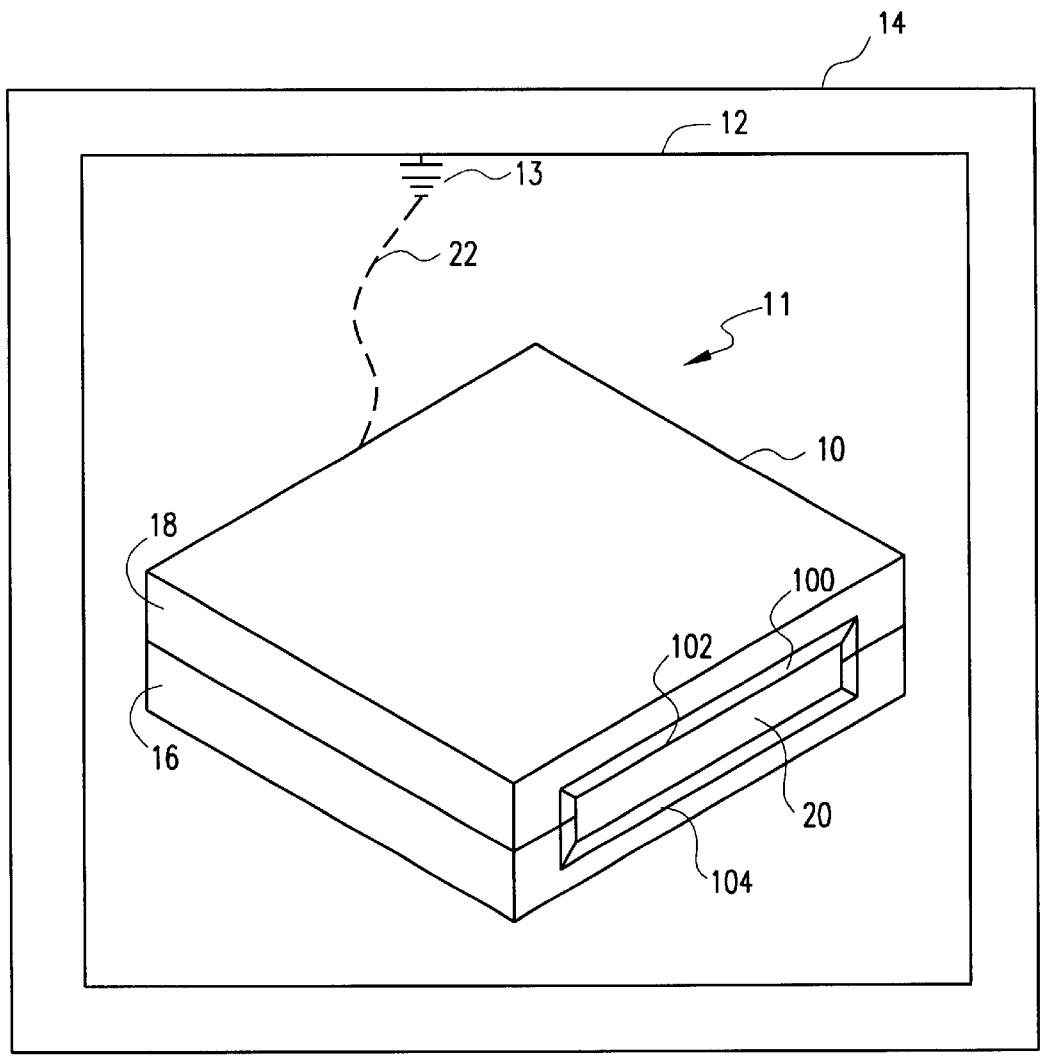
FIG. 1 is schematic, perspective view of a card reader housing according to a preferred embodiment of the present invention.

FIG. 1 shows a schematic, perspective view of a card reader housing 10 of a smart card reader 11 according to a preferred embodiment of the present invention. Housing 10 is typically electrically connected to a printed circuit board shown schematically at 12. Printed circuit board 12 has circuitry (not shown) for interfacing with integrated circuit 212 of smart card 200 and an electrical ground line 13. Housing 10, and printed circuit board 12, are typically disposed within an electronic apparatus shown schematically at 14. Apparatus 14 may be, by way of example, a pay telephone, an automated teller machine, an in-home digital satellite system, a "set top" box used with cable television, or other similar equipment.

Housing 10 generally includes a base 16 and a cover 18 that define a slot 20 for receiving smart card 200. Housing 10 may be grounded to ground line 13 of printed circuit board 12 via a ground path shown schematically at 22. Although not shown in FIG. 1, housing 10 also generally includes a plurality of conventional conductive terminals electrically connected to the circuitry of printed circuit board 12 and for making electrical connection with operative regions 210 of smart card 200. Housing further generally includes a conventional switch for physically contacting a portion of smart card 200, such as leading edge 204, so as to indicate when the circuitry of printed circuit board 12 should read integrated circuit 212.

Housing 10 is preferably made from a non-conductive plastic, although any conventional non-conductive electronics housing material could also be utilized for housing 10. Alternatively, as described in greater detail hereinbelow, base 16 and/or cover 18 may be made from a conventional "statically dissipative composite material" or "conductive composite material". As used in the present invention, a "statically dissipative composite material" is a generally insulating material containing conductive additives resulting in a surface resistivity in the range from about $1 \times 10^6$ up to about $1 \times 10^{10}$ ohms/sq (ohms/square). Such materials are highly resistive and only slightly conductive, and such materials minimize electrical "leakage" to nearby electronic components and help to insure that all components are properly electrically isolated. A preferred class of statically dissipative composite materials are thermoplastics containing conductive additives such as carbon fiber or carbon powder. A specific example of such a preferred statically dissipative thermoplastic composite is the STAT-KON Dissipative Composites, which are commercially available from LNP Engineering Plastics, Inc. of Exton, Pa. As used in the present invention, a "conductive composite material" is a generally insulating material containing conductive additives resulting in a surface resistivity in the range from about $1 \times 10^2$ up to about $1 \times 10^6$ ohms/sq. Such materials are also highly resistive and only slightly conductive, but such materials are less resistive, and more conductive, than statically dissipative composite materials. A preferred class of conductive composite materials are thermoplastics containing conductive additives such as carbon fiber, carbon powder, stainless steel, or nickel coated carbon reinforcements. A specific example of such a preferred conductive thermoplastic composite is the STAT-KON Conductive Composites, which are commercially available from LNP Engineering Plastics, Inc. of Exton, Pa. The terminals and switch located within card reader housing 10 are preferably made from a conventional electrically conductive metal, such as a copper alloy, a beryllium copper alloy, a phosphor-bronze alloy, or brass.

Figure 2:
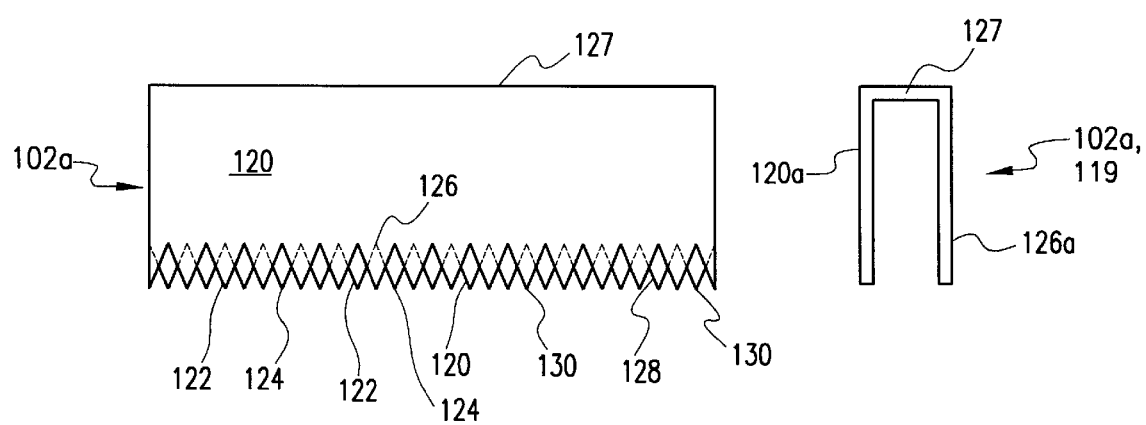
FIG. 2 is an enlarged, schematic, front view of a first preferred embodiment of an array of protrusions of the card reader housing of FIG. 1.

Housing 10 has a surface 100 proximate slot 20. Surface 100 contains an array of protrusions 102 that are preferably spaced along the entire length of surface 100. Preferred embodiments for array 102 are shown in FIGS. 2 through 4 and are discussed in greater detail hereinbelow. Each of the protrusions of array of protrusions 102 preferably has a sharp or pointed tip that is disposed proximate the top side of slot 20. Therefore, the sharp tips of the protrusions are disposed proximate upper surface 206 of smart card 200 as it is inserted into slot 20. As is explained in greater detail hereinbelow, array of protrusions 102 is effective in safely removing electrostatic charge from smart card 200.

Preferably, surface 100 is somewhat recessed from the exterior of housing 10 so as to protect array of protrusions 102, and to protect a user of smart card 200 from the sharp tips of array 102. Although surface 100 is shown in FIG. 1 as an integrally formed portion of cover 18, a member 100 having array of protrusions 102 can also be separately formed and coupled to cover 18 via screws, rivets, epoxy, or other conventional fastening means. In addition, although not shown in FIG. 1, an array of protrusions similar to array 102 may alternatively, or additionally, be formed on or coupled to surface 104 of base 16. In such case, the sharp tips of the protrusions are disposed proximate lower surface 208 of smart card 200 as it is inserted into slot 20.

Array of protrusions 102 is preferably made from a conventional electrically conductive material, such as an aluminum alloy, a copper alloy, a beryllium copper alloy, a phosphor-bronze alloy, brass, or steel. Alternatively, it is believed that array of protrusions may also be made from a statically dissipative composite material or a conductive composite material, if desired. Manufacturability and corrosion resistance are important considerations in selecting the particular conductive metal used for array of protrusions 102.

Referring now to FIG. 2, an enlarged, schematic, front view of a first preferred embodiment of array of protrusions 102a for use in card reader housing 10 is illustrated. Array of protrusions 102a generally comprises a sheet of conductive metal 120 having a plurality of protrusions 122 with sharp tips 124, and a second sheet of conductive metal 126 having a plurality of protrusions 128 with sharp tips 130. Protrusions 122 and 128 preferably have a "saw tooth" geometry. Sheets 120 and 126 are preferably substantially similar in structure. However, sheets 120 and 126 are aligned and coupled together via conventional fastening means so that tips 124 and tips 130 are interdigitated. Alternatively, as shown in FIG. 2A, a single sheet of conductive metal 119 may be folded so as to form a first leg 120a having a plurality of protrusions 122 and a second leg 126a having a plurality of protrusions 128 spaced apart and coupled together by an intermediate member 127 so that tips 124 and 130 are interdigitated. A preferred example of a construction of array of protrusions 102a that is believed to be effective in safely removing electrostatic charge from smart card 200 is to manufacture protrusions 122 and 128 on about 0.10 inch centers on their respective sheets 120 and 126, or legs 120a and 126a, and then to align sheets 120 and 126, or legs 120a and 126a, so as to interdigitate protrusions 122 and 128 to be on about 0.050 inch centers. If array of protrusions 102a is formed by folding as described above in connection with FIG. 2A, leg 120a and leg 126a are preferably spaced from about 0.05 inches to about 0.5 inches from each other. Of course, constructions with other dimensions may work well for certain other applications of array of protrusions 102a. Array of protrusions 102a can be easily and inexpensively manufactured using conventional automated stamped part machinery.

Figure 3A:
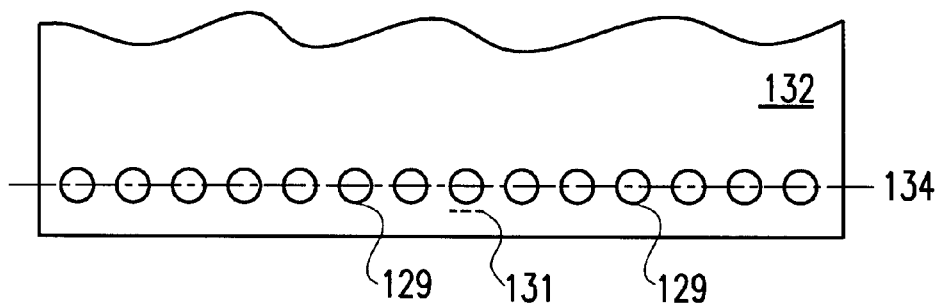
FIG. 3A is an enlarged, schematic, front view illustrating one of the steps in making a second preferred embodiment of an array of protrusions of the card reader housing of FIG. 1.
Figure 3B:
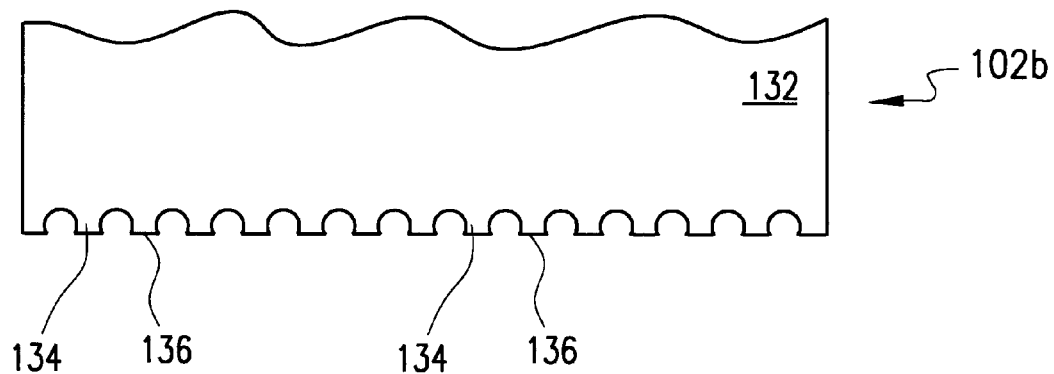
FIG. 3B is an enlarged, schematic, front view of the completed array of protrusions of FIG. 3A.

FIGS. 3A and 3B show an enlarged, schematic, front view of a second preferred embodiment of an array of protrusions 102b for use in card reader housing 10. As shown in FIG. 3A, array of protrusions 102b is preferably made by using conventional automated machinery to punch a plurality of aligned holes 129 into a sheet of conductive metal 132. Each of holes 129 are then cut along line 134 so as to produce a completed array 102b, as shown in FIG. 3B. Array of protrusions 102b has a plurality of protrusions 134 with sharp tips 136. Although sharp tips 136 are shown with a relatively flat surface for clarity of illustration in FIGS. 3A and 3B, sharp tips 136 actually terminate in a very sharp tip due to the spacing and sizing of holes 129 and the location of line 134 relative to a bottom edge 131 of holes 129. A preferred example of a construction of array of protrusions 102b that is believed to be effective in safely removing electrostatic charge from smart card 200 is to manufacture protrusions 134 by punching holes 129 having about a 0.030 inch diameter in sheet 132 on about 0.050 inch centers, and then cutting line 134 about 0.005 inches from bottom edge 131. Of course, constructions with other dimensions may work well for certain other applications of array of protrusions 102b. Similar to array of protrusions 102a, array of protrusions 102b can be easily and inexpensively manufactured using conventional automated machinery.

Figure 4A:
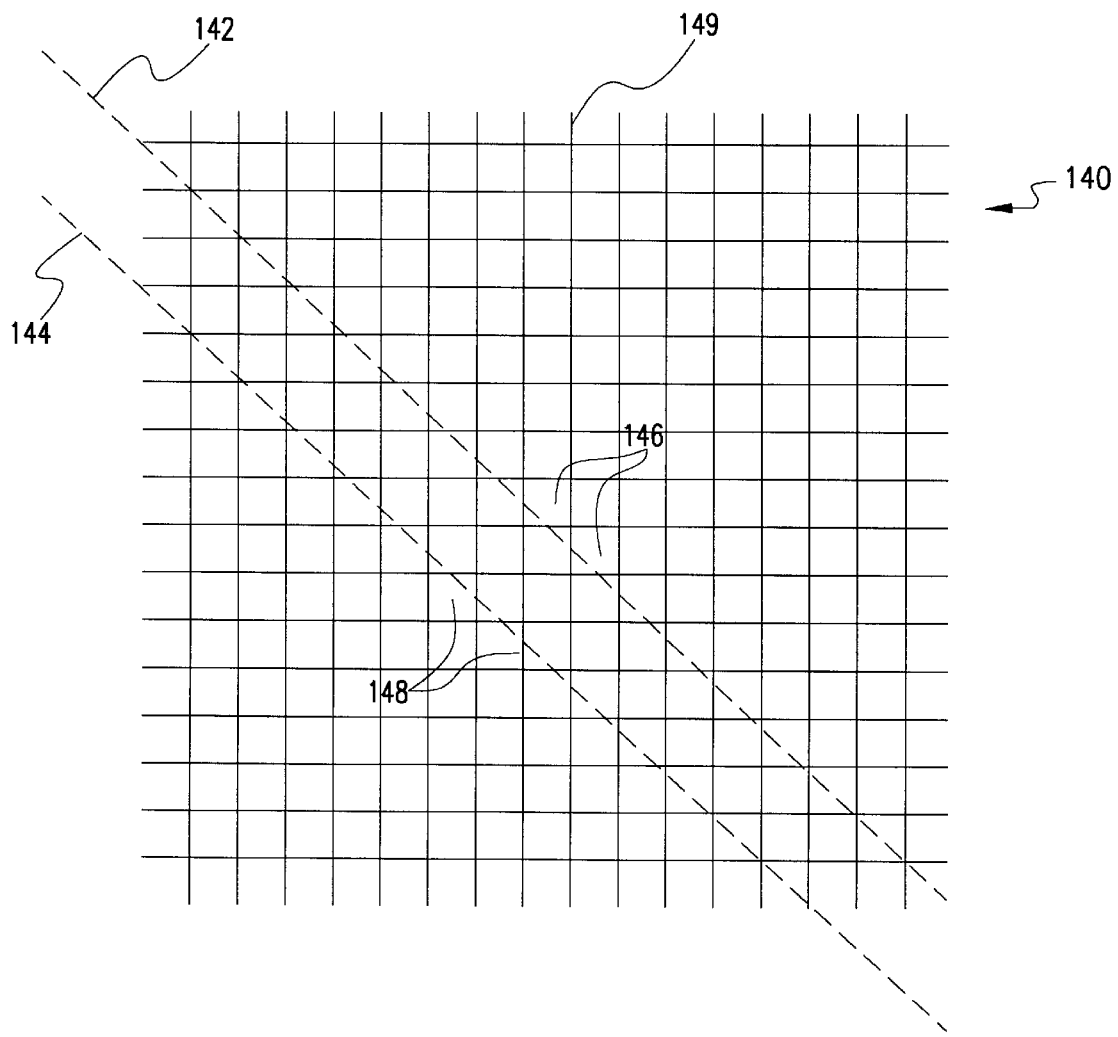
FIG. 4A is an enlarged, schematic, front view illustrating one of the steps in making a third preferred embodiment of an array of protrusions of the card reader housing of FIG. 1.
Figure 4B:
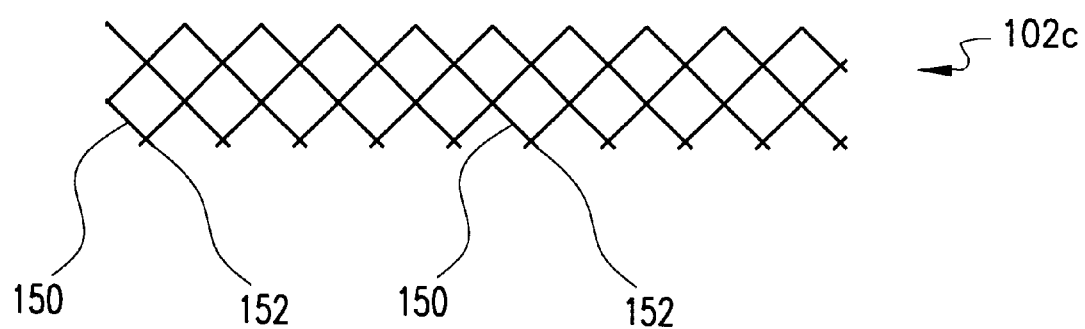
FIG. 4B is an enlarged, schematic, front view of the completed array of protrusions of FIG. 4A.

FIGS. 4A and 4B show an enlarged, schematic, front view of a third preferred embodiment of an array of protrusions 102c for use in card reader housing 10. As shown in FIG. 4A, array of protrusions 102c is preferably made by using automated machinery to cut a conventional metal mesh or screen 140 along lines 142 and 144. Lines 142 and 144 each run along a diagonal of contiguous apertures 146 and 148, respectively. Individual strands 149 of screen 140 may have either a circular or rectangular cross-section. As shown in FIG. 4B, completed array of protrusions 102c has a plurality of protrusions 150 with sharp tips 152. A preferred example of a construction of array of protrusions 102c that is believed to be effective in safely removing electrostatic charge from smart card 200 is to use a screen 140 having square apertures with sides of about 0.042 inches on about 0.050 inch centers. Of course, constructions with other dimensions may work well for certain other applications of array of protrusions 102c. In addition, screen 140 may be easily and inexpensively manufactured using automated punching and cutting equipment if it is not commercially available in the desired dimensions.

Having described the structure and manufacturing of the preferred embodiments of card reader housing 10 and its array of protrusions 102, their operation so as to safely and efficiently remove electrostatic charge from smart card 200 being inserted into card reader housing 10 will now be described in greater detail in connection with FIGS. 1–5. Although the description hereinbelow is described in connection with a card reader housing 10 having an array of protrusions 102a, it is of course equally applicable to a card reader housing having array of protrusions 102b, 102c, or similar array of protrusions with sharp tips.

As mentioned hereinabove, normal handling of smart card 200, such as removal and insertion of a card from a user's wallet or billfold, may cause electrostatic charge to build up in the card. A typical amount of such charge is in the range of about 10,000 volts to about 30,000 volts, and more typically about 20,000 volts. When leading edge 204 of such a charged smart card 200 is inserted into slot 20 of card reader housing 10, upper surface 206 of smart card 200 is preferably passed in close proximity to protrusions 122 and 128 of array of protrusions 102a. Sharp tips 124 and 130 of protrusions 122 and 128, respectively, are preferably disposed about 0.050 inches, and more preferably about 0.020 inches or less, from upper surface 206 of smart card 200 within slot 20. Sharp tips 124 and 130 may contact upper surface 206, as long as such contact is made with minimal pressure so as not to damage smart card 200. The combination of the high voltage on smart card 200 and the sharp tips 124 and 130 of protrusions 122 and 128, respectively, naturally creates a high electric field strength in the area proximate, and/or in the gap between, sharp tips 124 and 130 and upper surface 206 of card 200. If this field strength is above a critical value, the air in the area of the electric field "breaks down" or ionizes. For a given voltage on smart card 200, the sharper tips 124 and 130, the higher the field strength. Similarly, for a given sharpness of tips 124 and 130, the higher the voltage on the card, the higher the field strength.

Although the electrical charge of the air remains neutral in bulk, a substantially equal number of positive and negative ions is circulated throughout this electric field. Smart card 200 may be entirely positively charged, entirely negatively charged, or contain areas of both positive and negative charge. The ions circulating in the electric field are attracted to oppositely charged areas on upper surface 206 of smart card 200 where they combine with the charge on the card, neutralize the charge, reduce the voltage on the card, and eliminate the danger of damage due to electric shock. If card reader housing 10 is alternatively, or additionally, formed with an array of protrusions substantially similar in structure to array 102 on surface 104 of base 16, such an array also neutralizes the charge on smart card 200 in a manner substantially similar to array 102.

As the voltage on smart card 200 drops, at some point the field strength drops below a critical value, and the air in the area proximate sharp tips 124 and 130 and upper surface 206 of smart card 200 is no longer ionized. However, tests have shown that a smart card 200 charged to about 20,000 volts can be neutralized or discharged to a value of below 5000 volts. An electrostatic charge of 5000 volts or less allows smart card 200 to be used in many applications without a significant danger of damaging integrated circuit 212 of smart card 200 or the circuitry of printed circuit board 12. In addition, it is believed that the present invention can be refined to neutralize or discharge a smart card 200 originally charged to about 20,000 volts to a level of about 500 to about 1000 volts or less, even further expanding the application of the present invention.

One should note that the present invention functions to safely and efficiently remove electrostatic charge from smart card 200 if array of protrusions 102 is electrically connected to a ground such as ground line 13 of printed circuit board 12 via a conductive card reader housing 10 and ground path 22, or otherwise. However, the present invention unexpectedly functions to safely and efficiently remove electrostatic charge from smart card 200 even if array of protrusions 102, and card reader housing 10, are not electrically connected to ground. Therefore, the present invention also provides simplicity of design, improved reliability, and a significant reduction in manufacturing costs for card reader housing 10 through the elimination of ground path 22.

The present invention removes electrostatic charge generally only from the portion of smart card 200 that actually passes beneath array of protrusions 102. Therefore, slot 20 is preferably formed to be "deep" enough so that operative regions 210 of smart card 200 pass beneath array of protrusions 102. Although it is not necessary to discharge the entire smart card 200 to substantially eliminate the danger of damaging electric shock, slot 20 may be formed so as to accept substantially the entire smart card 200, if desired.

From the above, it may be appreciated that the present invention provides a simple, low cost technique of safely and efficiently removing electrostatic charge from smart cards made from a non-conductive material, and especially an extremely non-conductive material. The present invention thus eliminates, or significantly reduces the chance of, damaging electrical shock due to such electrostatic charge. The apparatus of the present invention may be economically manufactured using conventional automated machinery.

The present invention is illustrated herein by example, and various modifications may be made by a person of ordinary skill in the art. For example, array of protrusions 102 may be manufactured using different techniques that those described hereinabove. As another example, array of protrusions 102 may be located at a different position proximate slot 20 than surfaces 100 or 104. As another example, although array of protrusions 102 has been described above with each of its protrusions preferably having a sharp or pointed tip, only selected ones of the protrusions in array of protrusions 102 may have a sharp tip, while the remaining protrusions may have a relatively less sharp or flat tip. By way of example, in certain applications it is believed that array of protrusions 102 may be formed with one protrusion having a flat tip, two protrusions having a flat tip, three protrusions having a flat tip, or four (or more) protrusions having a flat tip between adjacent protrusions having sharp tips. It is believed that the allowable number of protrusions having a flat tip between adjacent protrusions having sharp tips is dependent on both the size, and the pitch or spacing, of protrusions in array 102. As a further example, array of protrusions 102 may be utilized in applications other than card reader housing 10 where it is necessary to remove electrostatic charge from a generally non-conductive object, and especially an extremely non-conductive object, before insertion into a slot, receptacle, or port of an electronic apparatus.

It is thus believed that the operation and construction of the present invention will be apparent from the foregoing description. While the method and apparatus shown or described have been characterized as being preferred it will be obvious that various changes and modifications may be made therein without departing from the spirit and scope of the invention as defined in the following claims.

What is claimed is:

1. A smart card reader, comprising:

a housing having a slot for receiving a smart card;

an electrically ungrounded array of protrusions disposed on said housing spaced on centers of up to about 0.05 inch, selected ones of said protrusions having a sharp tip disposed proximate said slot, wherein said array of protrusions comprises a sheet of conductive material having a plurality of aligned holes formed therethrough, said sheet having a first end formed by cutting said sheet along a line passing through said aligned holes.

2. The smart card reader of claim 1 wherein each of said protrusions is defined by an area between adjacent ones of said aligned holes.

3. A smart card reader, comprising:

a housing having a slot for receiving a smart card;

an electrically ungrounded array of protrusions disposed on said housing spaced on centers of up to about 0.05 inch, selected ones of said protrusions having a sharp tip disposed proximate said slot, wherein said array of protrusions comprises a screen made from a conductive material having a first plurality of spaced strands, a second plurality of spaced strands coupled to and disposed generally orthogonal to said first plurality of spaced strands, and a plurality of apertures defined by intersections of said first and second plurality of spaced strands.

4. The smart card reader of claim 3 wherein said sharp tips are formed by cutting said screen along a diagonal of contiguous ones of said apertures.

5. A method of removing electrostatic charge from a smart card inserted into a slot of a smart card reader, comprising the steps of:

providing an array of protrusions spaced on centers of up to about 0.05 inch, selected ones of said protrusions having a sharp tip;

disposing said array of protrusions proximate a slot of a smart card reader so that said array of protrusions is not electrically connected to a ground;

inserting a smart card having an electrostatic charge thereon into said slot;

generating an electric field proximate said sharp tips and said surface of said card using said electrostatic charge of said card and said sharp tips; and utilizing said electric field to neutralize said electrostatic charge on said card, wherein said providing step comprises:

providing a sheet of conductive material;

forming a plurality of aligned holes through said sheet; and cutting said sheet along a line passing through said aligned holes.

6. A method of removing electrostatic charge from a smart card inserted into a slot of a smart card reader, comprising the steps of:

providing an array of protrusions spaced on centers of up to about 0.05 inch, selected ones of said protrusions having a sharp tip, disposing said array of protrusions proximate a slot of a smart card reader so that said array of protrusions is not electrically connected to a ground;

inserting a smart card having an electrostatic charge thereon into said slot;

generating an electric field proximate said sharp tips and said surface of said card using said electrostatic charge of said card and said sharp tips; and utilizing said electric field to neutralize said electrostatic charge on said card, wherein said providing step comprises:

providing a screen made of a conductive material, said screen having a first plurality of spaced strands, a second plurality of spaced strands coupled to and disposed generally orthogonal to said first plurality of spaced strands, and a plurality of apertures defined by intersections of said first and second plurality of spaced strands; and cutting said screen along a diagonal of contiguous ones of said apertures.

7. A method of removing electrostatic charge from a smart card inserted into a slot of a smart card reader, comprising the steps of:

providing an array of protrusions spaced on centers of up to about 0.05 inch, selected ones of said protrusions having a sharp tip;

disposing said array of protrusions proximate a slot of a smart card reader so that said array of protrusions is not electrically connected to a ground;

inserting a smart card having an electrostatic charge thereon into said slot;

generating an electric field proximate said sharp tips and said surface of said card using said electrostatic charge of said card and said sharp tips; and utilizing said electric field to neutralize said electrostatic charge on said card, wherein said providing step comprises:

providing a sheet of conductive material;

forming a plurality of parallel rows of apertures through said sheet; and cutting said sheet along a diagonal of contiguous ones of said apertures.

8. The method of claim 7 wherein each of said apertures has a quadrilateral shape.

* * * * *